(12) United States Patent
Soldo

(10) Patent No.: US 7,268,307 B2
(45) Date of Patent: Sep. 11, 2007

(54) SIGNAL ACTUATOR DEVICE FOR A POSITION ADJUSTMENT CONTROL

(75) Inventor: Giovanni Soldo, Lonato (IT)

(73) Assignee: Soldo S.r.l., Desenzano del Garda (Brescia) (IT)

( * ) Notice: Subject to any disclaimer, the term of this patent is extended or adjusted under 35 U.S.C. 154(b) by 304 days.

(21) Appl. No.: 11/140,603

(22) Filed: May 31, 2005

(65) Prior Publication Data
US 2005/0264106 A1    Dec. 1, 2005

(30) Foreign Application Priority Data
May 31, 2004    (IT) .......................... MI2004A1099

(51) Int. Cl.
*H01H 3/00*    (2006.01)
(52) U.S. Cl. .................. 200/17 R; 200/18; 200/47; 200/31 R; 200/308; 200/336; 200/573; 200/574
(58) Field of Classification Search .......... 200/38 CA, 200/19.13, 19.21, 19.03, 19.2, 38 B, 38 BA, 200/38 R, 329, 33 R, 573, 574, 308, 336, 200/52 R, 19.01, 36, 33 B, 338, 47, 501, 200/564, 568; 137/554, 551, 556, 553; 251/291, 251/292; 340/686, 691; 116/4
See application file for complete search history.

(56) References Cited

U.S. PATENT DOCUMENTS

| | | | | |
|---|---|---|---|---|
| 4,214,133 A | * | 7/1980 | Wolford et al. | 200/19.21 |
| 4,939,320 A | * | 7/1990 | Graulty | 200/17 R |
| 4,962,290 A | * | 10/1990 | Nelson et al. | 200/308 |
| 5,222,457 A | * | 6/1993 | Friedrich | 116/284 |
| 5,223,822 A | | 6/1993 | Stommes et al. | |
| 5,305,781 A | | 4/1994 | Raymond, Jr. et al. | |
| 6,028,280 A | * | 2/2000 | Winkler et al. | 200/573 |
| 6,087,607 A | * | 7/2000 | Dohnal et al. | 200/574 |
| 6,188,030 B1 | * | 2/2001 | Livers et al. | 200/38 R |
| 7,156,121 B2 | * | 1/2007 | Cox et al. | 137/554 |

FOREIGN PATENT DOCUMENTS

EP          0921338         6/1999

* cited by examiner

Primary Examiner—Michael A Friedhofer
(74) Attorney, Agent, or Firm—Shoemaker and Mattare

(57) ABSTRACT

Signal Actuator device, having a support structure; a bottom drive shaft, tunable in a seat of the support structure; a first torsional coupling, integral with and surrounding the bottom drive shaft; at least a first cam torsionally coupled to the first torsional coupling in a selective manner for adjusting the angular position thereof relative to the bottom drive shaft; the at least one first cam actuating an electrical device supported by the support structure; a top drive shaft, torsionally coupled to bottom drive shaft in a selectively removable member; a second torsional coupling, integral with and surrounding the top drive shaft; at least a second cam torsionally coupled to the second torsional coupling in a selective manner for adjusting the angular position thereof relative to the removable top drive shaft; and the at least one second cam actuating an electrical device supported by the support structure.

32 Claims, 5 Drawing Sheets

SIGNAL ACTUATOR DEVICE FOR A POSITION ADJUSTMENT CONTROL

FIELD OF THE INVENTION

The present invention relates to a signal actuator device for a position adjustment control.

BACKGROUND OF THE INVENTION

Devices of this type are known, provided with drive shafts having the possibility of changing the relative position of control cams relative to said shafts.

Signal actuators of this type are already known in the prior art, for example from U.S. Pat. No. 5,305,781. In this known device, in order to locally adjust the signal actuator it is necessary to provide for a possibility of positioning the control cams into multiple angular positions relative to the drive shaft; it is therefore known, for example, to provide a fastening by shape-coupling of the control cams through a toothing of the components mentioned hereinabove. In this case, to make any adjustments it is necessary to axially move at least one control cam provided with an inner toothing beyond the outer toothing engagement zone of the drive shaft, in order to carry out the desired adjustment of an intermediate zone of the drive shaft not provided with toothing. Afterwards it is necessary to rearrange the control cam to the original axial position for carrying out a new shape coupling again. It is apparent that such an adjustment is excessively expensive and not practical, in particular in the case a plurality of control cams is arranged axially superimposed on one another and it is disadvantageously necessary to move at least the control cam to the bottom end of the drive shaft. In such a situation, it may understandably occur that the top control cam originally located in the correct angular position relative to the drive shaft, after the adjustment operation that has caused its separation and the subsequent reintroduction, is in an incorrect angular position relative to the drive shaft and that this requires a further adjustment. Moreover, as disclosed for example in U.S. Pat. No. 5,223,822, it is known to provide the control cams with a front toothing that interacts respectively with a front toothing on a seat of the drive shaft. With the aid of a spring acting in axial direction, the two correspondingly coupled front toothing sets are pressed against one another so as to form a torsion-resistant connection between the control cam and the drive shaft. In this way, in case of adjustment, by acting against the spring force it is possible to temporarily disconnect the control cam from the fixed toothing on the shaft and after the transfer to the desired angular position, replace the cam coupled to the fixed toothing of the drive shaft, without the action of a further external force. This allows firmly coupling the control cam to the drive shaft, allowing operating conditions with high angular accelerations while ensuring that the angular position of the control cam relative to the drive shaft is maintained. It is understood, however, that the adjustment principle mentioned above is not advantageous as it requires a greater construction complexity and implies an increase of the overall dimensions of the device, as spaces overlying and underlying the control cams are to be provided for the disengagement and the optional rotation of the control cams, with clear disadvantages.

It is also known in the art, for example in EP-A-0921338, a coupling system between at least two stacked control cams and an hollow drive shaft provided with a limited toothed portion of the outer surface of the hollow drive shaft for the remainder free from toothing that has an elastic flexibility degree in radial direction. Such drive shaft is connectable through the above partial outer toothing to the stacked control cams; in this case, the adjustment is entrusted to the elastic flexibility of the toothed portion of the outer surface of the drive shaft. In this way, in case of adjustment, by acting with an appropriate tool against the elastic force of said toothed portion, it is possible to arrange the control cams in the desired angular position. Actually, the described solution exhibits small overall dimensions, but the engaging limited to the toothed portion of the outer surface of the hollow shaft, by offering a resistance due to said partial toothing only, defines an upper limit to the inertial action applicable to the control cam and drive shaft coupled system. Beyond said limit, the relative position between the drive shaft and the control cams is inevitably lost.

There is therefore the need of providing a signal actuation device for an adjustment control which should be useful also in operating conditions with high angular accelerations, ensuring a firm fixing between control cams and drive shaft; moreover, said device must have small overall dimensions.

SUMMARY OF THE INVENTION

The object of the present invention is to provide a signal actuation device for an adjustment control such as to meet the above needs and such as to overcome at the same time the disadvantages mentioned with reference to the prior art.

BRIEF DESCRIPTION OF THE DRAWINGS

The features and advantages of the present invention will appear more clearly from the following description, made by way of an indicative non-limiting example with reference to the annexed drawings, wherein.

DETAILED DESCRIPTION OF THE PREFERRED EMBODIMENTS

Figure 1:
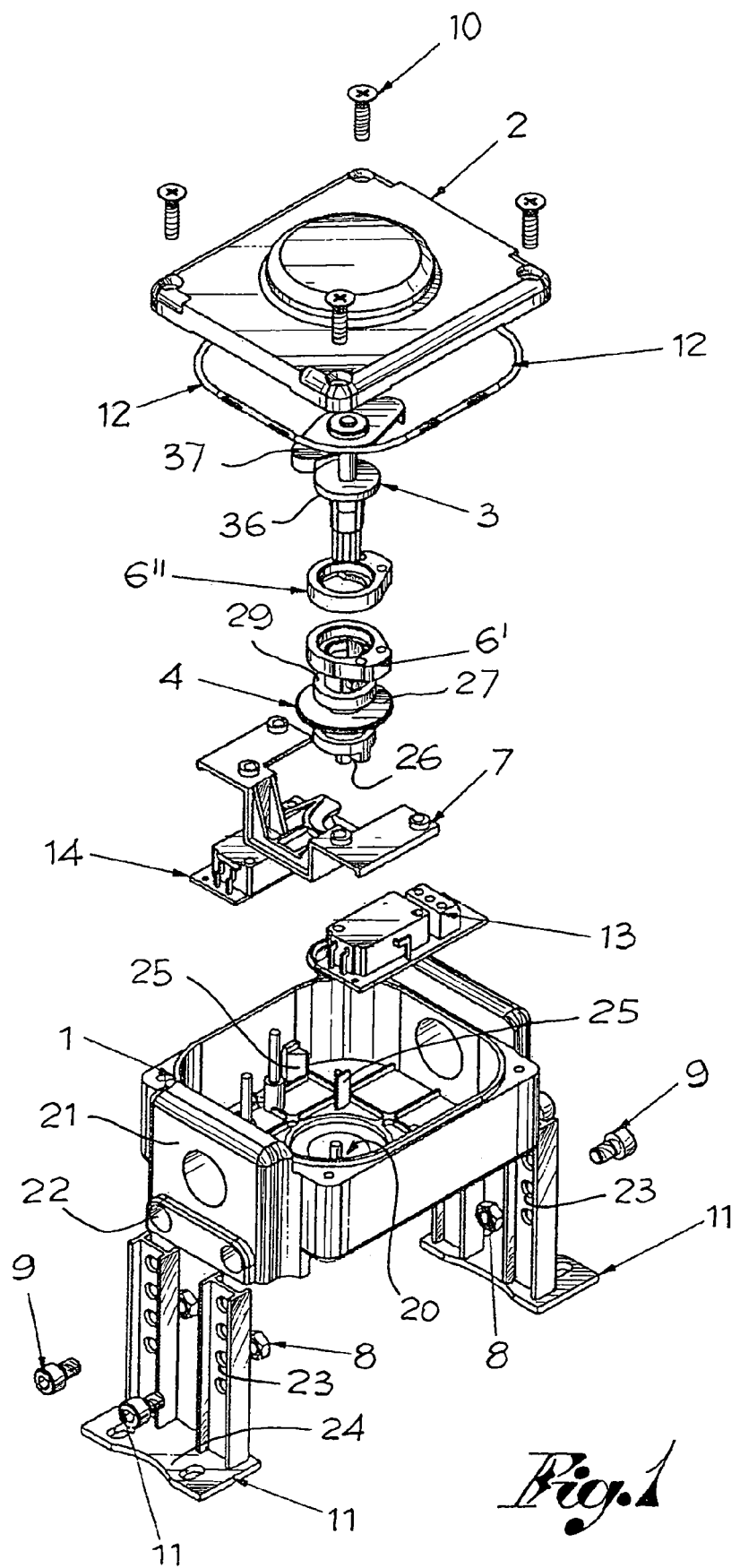
FIG. 1 shows an axonometric exploded view of an example of embodiment of the present invention.

With reference to the annexed figures, and as regards a possible embodiment, reference numeral 1 indicates a support structure, or body, which defines, for example, a housing advantageously shaped as a parallelepiped with for example at least one lacking surface and another surface wherein there is obtained a thorough opening 20.

In one embodiment thereof proposed as non-limiting example, said housing exhibits two side protrusions 21 wherein there are obtained at least two cavities geometrically connectable with at least two carrying brackets 11 that engage into said side protrusions and at least one thorough sealing hole 22, preferably two holes, whose axis is arranged in a direction transversal to the direction of engagement of said brackets, said carrying brackets 11 having a height adjustment system obtained in the surface thereof consisting of thorough adjustment holes that allow the possible geometrical coupling between at least one sealing nut 8, at least one support screw 9, at least one thorough sealing hole 22 and at least one thorough adjustment hole 23. Said brackets 11 have a cross support surface 24 suitable for being fixed to a support surface, for example a masonry construction (not shown in the figure), for example through thorough openings. Moreover, said support surface is favourably adjustable by engaging the brackets into one of the different directions allowed by the geometry of the coupling of said brackets 11 with said geometrically connectable cavities obtained in said side protrusions present for example on said housing 1.

In said body of device 1 there are housed two electrical devices 13 and 14, said electrical devices being firmly locked by a clamp 7, for example a stop plate that constrains them to positioning projections 25 suitable for arranging them into a predetermined position relative to further components of the device that will be described in detail hereinafter.

A stem, or bottom drive shaft 4 is further inserted into said body of device 1, protruding with one end thereof from a surface of said body 1 through said thorough opening 20. Said stem can be connected for example by a connecting pin 26 by shape coupling with an adapted or conjugate end of an eventual transmission shaft, not shown in the figure.

The bottom drive shaft 4 exhibits a disc-shaped surface, or flange 27, transversal to the axis of the bottom drive shaft 4 that easily rests preferably on the inner surface of the body of device 1.

In a possible variant of the present invention, said electrical devices 13 and 14 are symmetrically arranged relative to said stem 4 inserted in the surface of housing 1.

Figure 4:
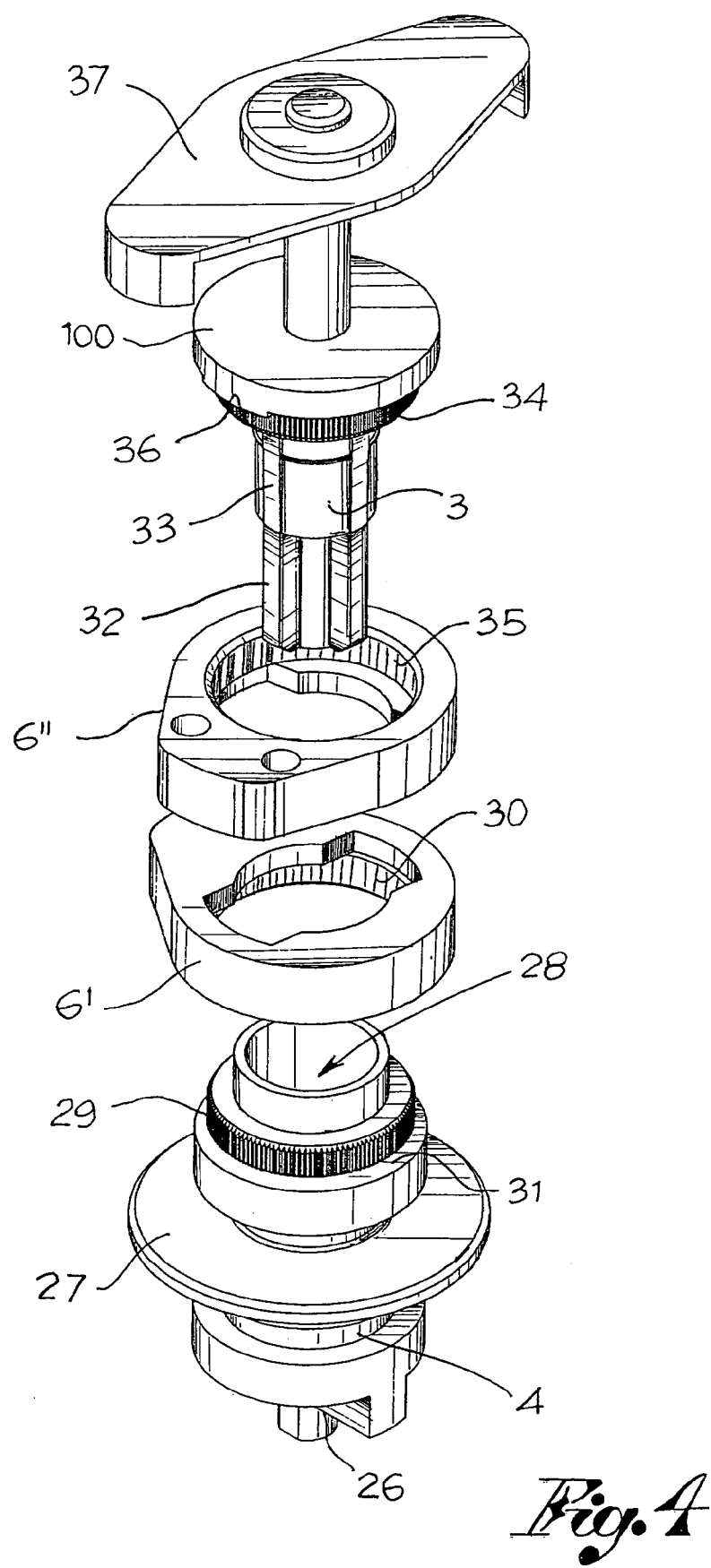
FIG. 4 shows an axonometric exploded view of details of the device of FIG. 1.
Figure 5:
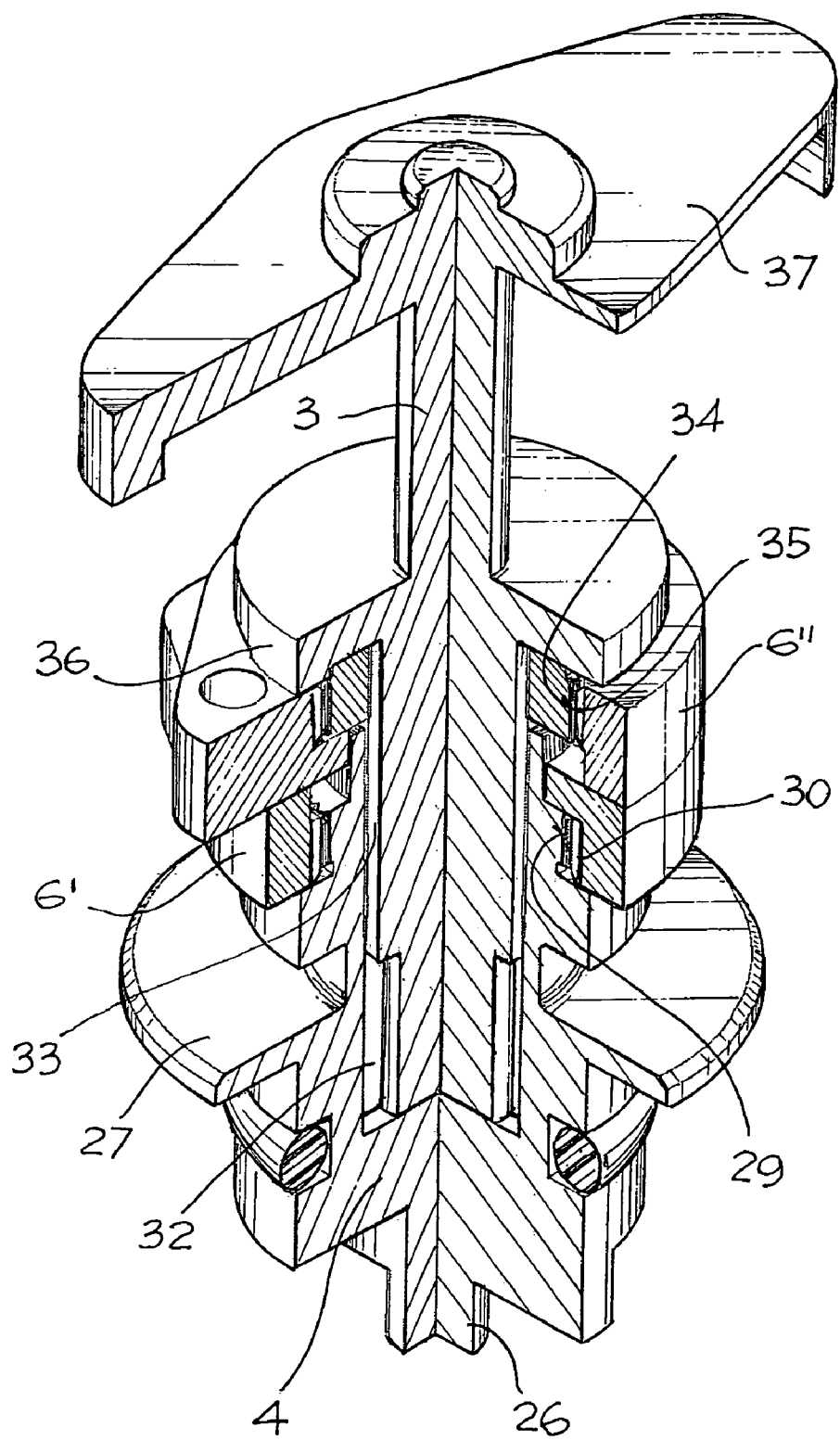
FIG. 5 shows an axonometric partly section view of details of the device of FIG. 4.

A housing cavity 28 (FIG. 4) is obtained at the top end of said stem 4.

Along the outer perimeter of said stem 4, a relief toothing 29, also called knurled, is obtained.

Said bottom drive shaft 4 comprises a projection, preferably annular, forming an axial abutment surface 31 arranged, relative to said toothing 29, at the side opposed to the free end provided with said coupling housing 28.

Geometrically coupled to said toothing there is provided, for example, at least one bottom control cam 6'. This is made with an annular configuration and exhibiting a central thorough hole, whose inner wall is provided with a toothing 30 or knurled, for example with a shape conjugate to that of the stem. The latter inner toothing 30 interacts with said outer toothing of the bottom drive shaft 4 so as to carry out a shape coupling between the bottom drive shaft 4 and the bottom control cam 6'.

Inserted in axial direction into said housing cavity 28 is a top drive shaft 3, along whose outer surface there is obtained a longitudinal shaping, or groove 32, so that it forms a shape coupling with conjugate groove provided in said housing cavity 28.

Said top drive shaft 3 is integral to said bottom drive shaft 4. Said removable integral connection is for example obtained by slightly conical radial projections 33 which, by coupling into said housing 28 of the bottom shaft, determine a force coupling, or are forced, into said housing 28.

Favourably, said stem 4 and said top shaft 3 when coupled, form an integral system with each other.

Preferably, an annular structure is axially inserted relative to the top shaft 3, which exhibits a toothing 34 or knurled in the outer wall, suitable for geometrically coupling in the direction of the axis of the top drive shaft with at least one annexed top control cam 6", said top control cam being made with an annular configuration and exhibiting a central thorough hole, whose inner wall is provided with a conjugate toothing 35 or knurled. At the side opposed to the free and coupling end of said top shaft 3 there is provided a projection forming at least one axial abutment surface 36.

On top of said top shaft there is associated an indicator 37 suitable for displaying the angular position of said shaft.

According to an embodiment, the top portion of the top shaft 3 exhibits a shape useful for providing angular positioning indications to an operator, such shape being preferably assimilable to the shape of a flywheel.

Said housing 1 exhibits at least one threaded hole along the top edge of the surface thereof. In a favourable configuration, there are provided four threaded holes.

Housing 1 is closed at its top side preferably by a cover 2 which in a favourable configuration can be made for example of a translucent or transparent material, and can exhibit for example at least one threaded thorough hole on the surface thereof. Preferably, there are provided four threaded thorough holes.

In an optional embodiment of the present invention, a gasket 12 is inserted between the contact surfaces of said housing 1 and said cover 2. The presence of at least one sealing screw 10 carries out the fixing of said cover 2 relative to said housing 1, coupling at least one threaded hole present on the surface of housing 1 to at least one threaded thorough hole present on the surface of cover 2. In a further configuration of the invention, four sealing screws 10 can be provided, which engage said threaded holes present on the surface of housing 1 and said threaded thorough holes present on the surface of cover 2.

Figure 2:
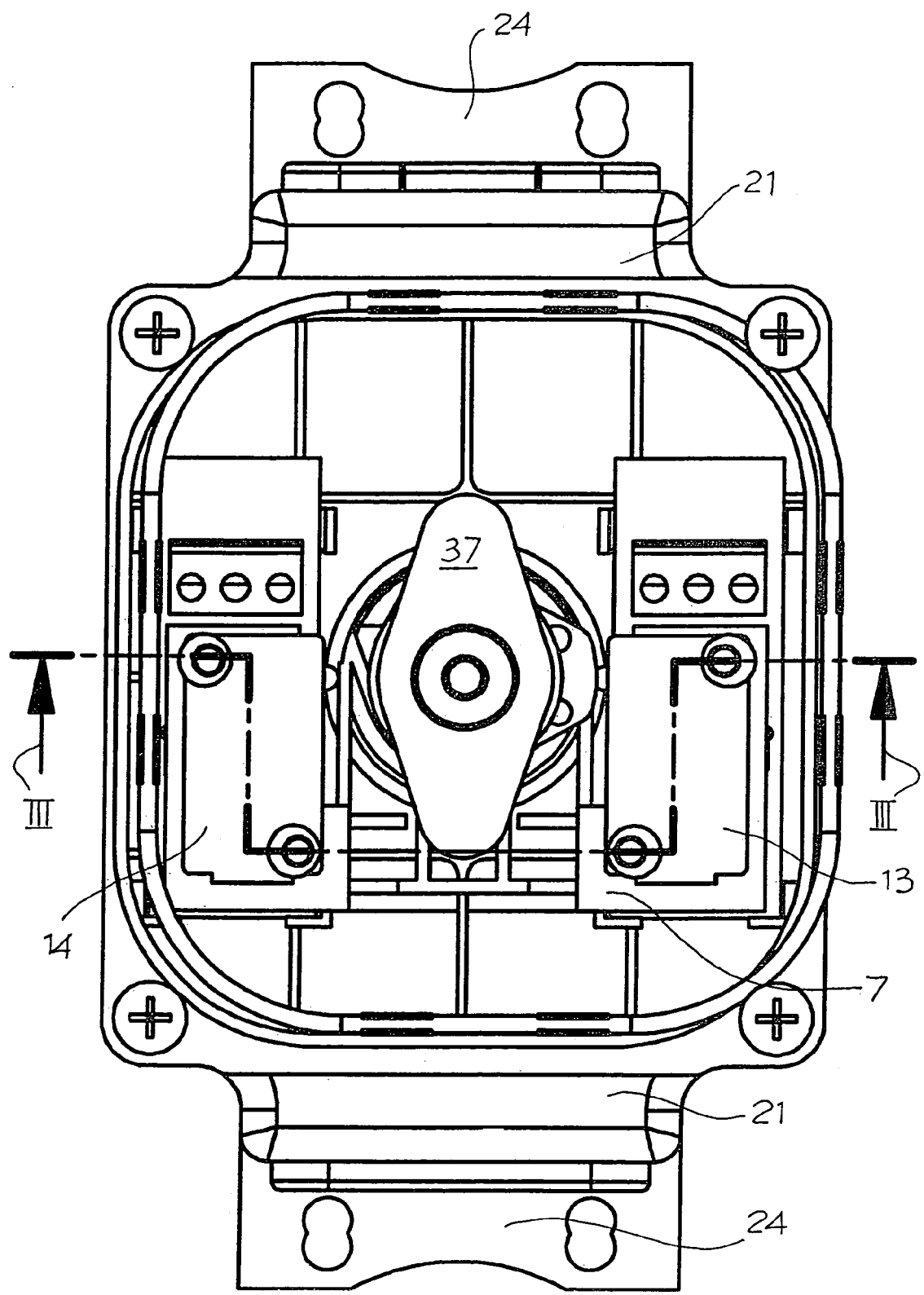
FIG. 2 shows an overall top view of a signal actuation device for an adjustment control according to the invention.
Figure 3:
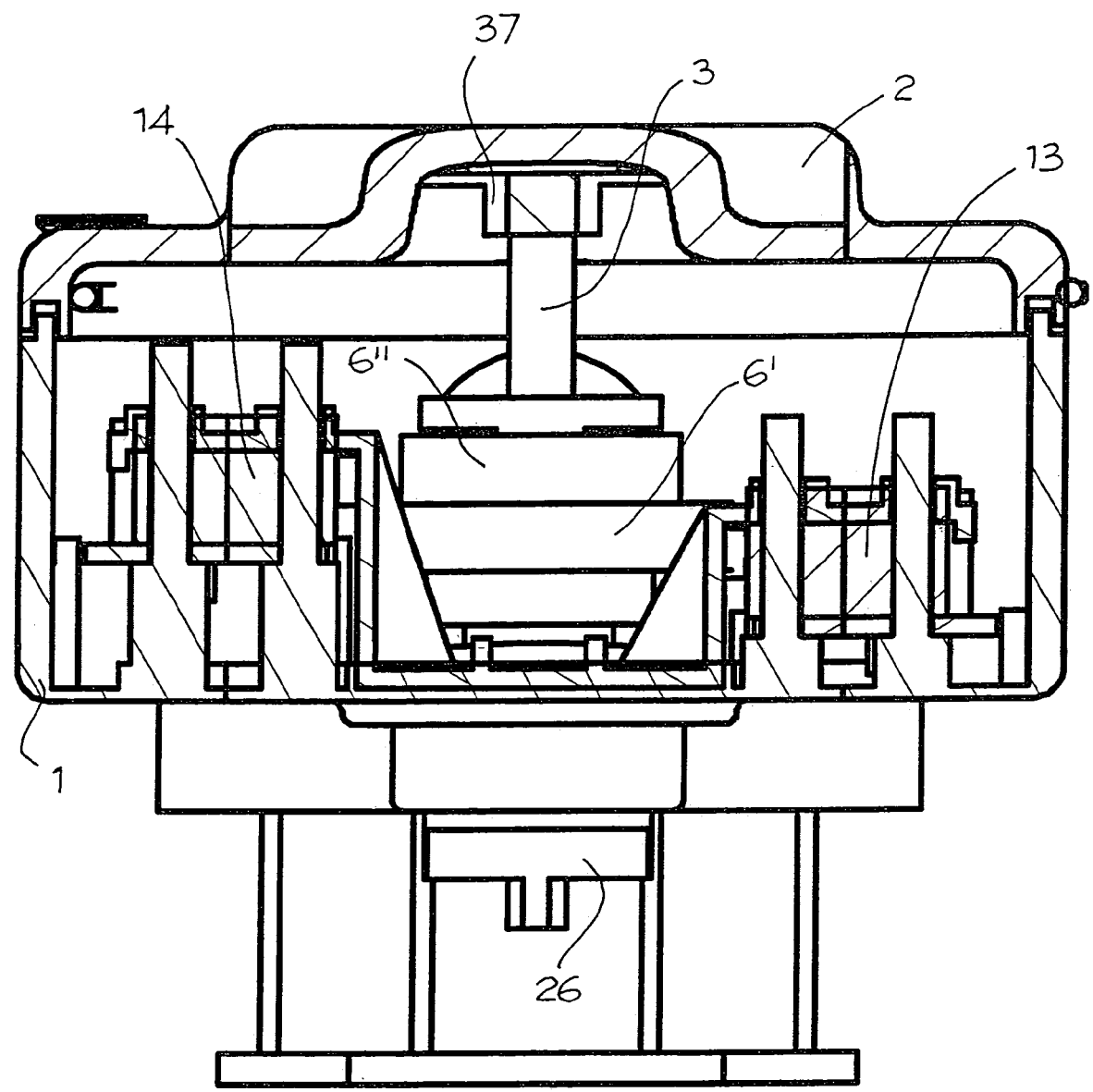
FIG. 3 shows a section view along line III-III of the device of FIG. 2.

In a preferred embodiment, said device is shown in a top view in FIG. 2, whereas FIG. 3 shows an embodiment in a side section view. As it can be understood, the bottom drive shaft 4 transmits any twisting torque received for example from a transmission shaft coupled to said connection pin present at the bottom of stem 4, to the integrally coupled top drive shaft 3. Said twisting torque causes a rotation of stem 4 and of the top drive shaft 3 about its axis.

Favourably, said rotation about the axis of stem 4 transmitted by the top drive shaft 3 can for example be in phase.

Moreover, in a further embodiment, said stem 4 transmits said twisting torque to the bottom control cam 6' integrally coupled to stem 4 for example through the geometrical coupling of said toothing 29. Advantageously, said twisting torque transmitted to the top shaft 3 carries said top control cam 6" into rotation, favourably using the geometrical coupling between the knurled of said top control cam 6" and the toothing of said top shaft 3.

In a preferable embodiment configuration, said cams 6' and 6" are arranged as a package.

Moreover, said cams 6' and 6" during the rotary motion imparted to them by the twisting torque transmitted by stem 4 and by indicator 3 integrally coupled, advantageously interact with said electrical devices.

In a further embodiment said electrical devices can for example be electrical or mechanical switches 13, 14.

The embodiment as described above for example exhibits the advantage of being able to display the rotary motion of the drive shaft 3. Actually, if for example the rotary device is not engaged with a twisting torque, it is possible to check whether indicator 3 is moving or not by looking through cover 2 which in a possible embodiment is of a transparent material.

Moreover, by removing said sealing screws from cover 2 it is possible to remove said cover 2 and eventually physically access inside housing 1. If an easy adjustment of the relative angular position of at least one cam 6' relative to stem 4 is to be carried out, once cover 2 has been lifted as said it is possible to remove the top shaft 3 with an axial movement tending to release the geometrical coupling between said cavity 28 in the top portion of stem 4 and said shaping 32 obtained in the bottom portion of the top shaft 3.

In a favourable embodiment, said extraction can even be partial only, so that said top shaft 3 remains engaged with said stem 4, and the manoeuvring space required for the adjustment of a cam 6' is obtained. By operating in this way, advantageously the top control cam 6" remains integrally fixed to said top shaft 3.

At this point it is possible to carry out the desired adjustment by disconnecting at least one cam 6' from the bottom control shaft 4. Once the disconnection has been carried out, it is possible to axially replace a cam 6' in the desired angular position relative to stem 4. The top shaft 3 is then axially replaced into stem 4 in the same position it had before the adjustment operation. In this way and thanks to the integral coupling between cam 6" and the top shaft 3, the angular calibration of cam 6" relative to the top shaft 3 has advantageously been kept constant.

Since said indicator 3 is integrally coupled in its operating position to stem 4, also the angular position of cam 6" relative to said stem 4 is kept unchanged.

Advantageously, said cams are arranged again in a package structure.

Moreover, if the position of at least one cam 6" relative to the top driving shaft 3 is to be adjusted, it is advantageously possible to remove cover 2 as described and axially extract said top shaft 3 connected to stem 4. At this point with an axial movement it is possible to extract a cam 6" from its original seat and reconnect it to the top shaft 3 with similar axial movement, after rotating it to the desired angular position.

At this point it is possible to reassemble the integral system between stem 4 and top shaft 3 favouring their shape coupling for example with axial movement of the top shaft 3 towards stem 4.

Advantageously also the desired package arrangement of cams 6' and 6" is restored.

It is now clear that the described example of a possible embodiment of the invention certainly gives the advantage that it is possible to connect at least one bottom control cam 6' to a stem 4, using a shape coupling due to a toothing distributed along the entire outer perimeter of the stem top portion and the toothing present on the entire inner wall of cam 6'.

Moreover, it is favourably possible to geometrically couple a top control cam 6" through said toothing present on the entire inner wall of cam 6" to the toothing present along the entire perimeter of said annular structure axially inserted along the top shaft 3, annular structure advantageously obtained integrally with said top shaft. In this way, given the stability of the geometrical connection between stem 4 and the top shaft 3 and the presence of a resistant toothing on the entire round angle of the interaction surface between cam 6' and stem 4 and cam 6" and top shaft 3, it is possible to structure a rotating control device that can be subject to twisting torques, the strength of which is not limited by the presence of resistance surfaces only partly toothed. In this way it is possible to work even at high angular accelerations, without undergoing disadvantageous disconnections of cams 6' and 6" from their resistant seats.

The embodiment illustrated by way of an example, moreover, allows a package distribution of the cams, for example moving the first cam 6' in contact with the second cam 6", an arrangement not known in the prior art that produces very small overall dimensions thanks to the absence of further bodies arranged between the surfaces of the cams that reciprocally face each other. Moreover, in this embodiment, it is not necessary to provide for disengagement spaces, useful in the art for optional adjustments of the relative angular position of cams and shaft, overlying and/or underlying the cams for possible axial and rotating reciprocal movements of the cams themselves.

What is claimed is:

1. Signal actuator device for a position adjustment control, comprising:
   a support structure suitable for being connected to a position adjustment control, said support structure comprising a seat;
   a bottom driving shaft, turnably seated in said seat of the support structure, so as to couple to a control shaft;
   first torsional coupling means, integral with said bottom driving shaft and fully extending around said shaft;
   at least one first control cam torsionally coupled to said first torsional coupling means in a selective manner for adjusting an angular position relative to said bottom driving shaft;
   said at least one first cam being suitable for actuating, during rotation, an electrical device supported by said support structure;
   a top driving shaft, torsionally coupled to said bottom driving shaft in a selectively removable manner;
   second torsional coupling means, integral with said top driving shaft and fully extending around said shaft;
   at least one second control cam torsionally coupled to said second torsional coupling means in a selective manner for adjusting an angular position relative to said top removable driving shaft;
   said at least one second cam being suitable for actuating, during rotation, an electrical device supported by said support structure.

2. Device according to claim 1, wherein said top driving shaft is selectively separable from said bottom driving shaft, keeping the at least one second cam associated thereto.

3. Device according to claim 1, wherein each of said torsional coupling means selectively associated with the cams comprise a selectively removable geometrical coupling.

4. Device according to claim 3, wherein each of said coupling means comprise a toothing connectable to a complementary toothing provided in each of said cams.

5. Device according to claim 4, wherein said toothing is a straight toothing and suitable for engaging and disengaging with a complementary straight toothing provided into said cams according to a direction parallel to the axis of rotation of said driving shaft.

6. Device according to claim 4, wherein said toothing comprises a constant step.

7. Device according claim 1, wherein said torsional coupling means are integral with said driving shafts.

8. Device according to claim 1, wherein said driving shaft comprise at least one radial projection forming an abutment surface for said control cams.

9. Device according to claim 8, wherein said abutment surface comprises an abutment surface for axial movements of the cams, said surface being at a side opposed to the torsional coupling means relative to a free end of the driving shafts, the free end suitable for the connection to the corresponding driving shaft.

10. Device according to claim 1, wherein when associated to one another, said driving shafts with abutment surfaces thereof keep said cams axially constrained.

11. Device according to claim 1, wherein said at least one first cam and said at least one second cam contact each other.

12. Device according to claim 1, wherein each of the cams cooperates with a respective electrical device.

13. Device according to claim 1, wherein each of the cams cooperates with a single electrical device.

14. Device according to claim 1, wherein each of the cams actuates an electrical switch.

15. Device according to claim 1, wherein each of the cams actuates a mechanical switch.

16. Device according to claim 1, wherein said support structure comprises a housing suitable for containing said electrical device and, at least partly, the top and bottom driving shafts.

17. Device according to claim 16, wherein said housing is a housing sealed against liquid or vapour or gas infiltrations.

18. Device according to claim 1, wherein said top driving shaft is geometrically coupled to the bottom driving shaft.

19. Device according to claim 1, wherein at least one portion of said top driving shaft suitable for cooperating with the bottom driving shaft comprises a grooved profile.

20. Device according to claim 1, wherein at least one portion of said top driving shaft suitable for cooperating with the bottom driving shaft comprises a projection with variable radial dimension and suitable for a force coupling with a respective portion of a seat provided in the bottom driving shaft.

21. Device according to claim 1, wherein the bottom driving shaft comprises a seat suitable for the connection with the top driving shaft.

22. Device according to claim 1, wherein the bottom driving shaft comprises in a seat a grooved profile suitable for associating to a corresponding complementary profile provided in the top driving shaft.

23. Device according to claim 1, wherein the bottom driving shaft comprises a groove suitable for associating to a flange provided in stop means suitable for keeping the driving shaft in an operating position freely turnable constrained to the support structure.

24. Device according to claim 23, wherein said stop means are removable.

25. Device according to claim 1, wherein said bottom driving shaft comprises an abutment flange against said support surface.

26. Device according to claim 1, wherein said bottom driving shaft is associated to a sealing gasket cooperating with the seat of the support structure suitable for seating the bottom driving shaft.

27. Device according to claim 1, wherein there is comprised an indicator suitable for indicating the angular position of the driving shaft.

28. Device according to claim 27, wherein said indicator is integral with the top driving shaft.

29. Device according to claim 1, wherein said support structure supports the electrical device at a distance from the driving shafts suitable for cooperating with the control cams during the rotation of said driving shafts.

30. Device according to claim 29, wherein said devices and the driving shafts are kept in position by a stop plate.

31. Device according to claim 30, wherein said stop plate is constrained by riveted pins.

32. Device according to claim 30, wherein said stop plate is constrained by screws.

* * * * *